United States Patent
Hegemier et al.

(10) Patent No.: US 9,052,018 B2
(45) Date of Patent: Jun. 9, 2015

(54) ECCENTRICITY TOLERANT VALVE STEM SEAL ASSEMBLY

(75) Inventors: Timothy A. Hegemier, Avilla, IN (US); Robert W. Lehmann, Fort Wayne, IN (US); Alexander S. Williamson, Fort Wayne, IN (US)

(73) Assignee: Dana Automotive Systems Group, Inc., Maumee, OH (US)

( * ) Notice: Subject to any disclaimer, the term of this patent is extended or adjusted under 35 U.S.C. 154(b) by 541 days.

(21) Appl. No.: 13/179,648

(22) Filed: Jul. 11, 2011

(65) Prior Publication Data

US 2013/0015625 A1   Jan. 17, 2013

(51) Int. Cl.
*F01L 3/08* (2006.01)
*F16J 15/32* (2006.01)

(52) U.S. Cl.
CPC ........ *F16J 15/3224* (2013.01); *Y10T 29/49412* (2015.01); *F16J 15/32* (2013.01); *F16J 15/3208* (2013.01); *F01L 3/08* (2013.01); *F16J 15/3252* (2013.01); *F16J 15/3276* (2013.01); *F01L 2101/00* (2013.01); *F01L 2820/01* (2013.01)

(58) Field of Classification Search
CPC .......... F01L 3/08; F16J 15/32; F16J 15/3208; F16J 15/3212; F16J 15/3224; F16J 15/56
USPC ............ 277/502; 123/188.6, 190.17; 251/214
See application file for complete search history.

(56) References Cited

U.S. PATENT DOCUMENTS

| | | | |
|---|---|---|---|
| 2,207,400 A * | 7/1940 | Gass | 277/502 |
| 3,127,185 A * | 3/1964 | Evans | 277/553 |
| 3,910,586 A * | 10/1975 | Todaro | 277/502 |
| 4,125,265 A * | 11/1978 | Grzesiak | 277/502 |
| 4,304,414 A * | 12/1981 | Forch | 277/575 |
| 4,325,558 A | 4/1982 | Poggio | |
| 4,811,704 A * | 3/1989 | Boehmer et al. | 123/188.6 |
| 4,811,960 A * | 3/1989 | Stritzke et al. | 277/502 |
| 4,909,202 A | 3/1990 | Binford | |
| 4,919,090 A | 4/1990 | Deuring | |
| 5,174,256 A | 12/1992 | Binford | |
| 5,183,351 A | 2/1993 | Schneider | |
| 5,553,869 A | 9/1996 | Stamback | |
| 5,558,056 A * | 9/1996 | Sakata | 123/188.6 |

(Continued)

FOREIGN PATENT DOCUMENTS

EP    0 627 546 A1    12/1994
FR    1 375 628 A    10/1964

(Continued)

*Primary Examiner* — Kristina Fulton
*Assistant Examiner* — Nicholas L Foster
(74) *Attorney, Agent, or Firm* — Marshall & Melhorn, LLC

(57) ABSTRACT

An eccentricity tolerant valve stem seal assembly includes an elastomeric seal having an upper metal retainer extending down and within an upper seal portion which has an inwardly directed sealing lip for contacting a valve stem. There are also a flexible middle and a lower seal portions. The lower seal portion is connected to a lower metal seal retainer that is disposed up to a lower edge of the middle seal portion. The flexible middle seal portion allows the upper seal portion to flex from an eccentric valve stem without losing the sealing function of the sealing lip. In cooperation with the above described structure, a separate cover may be in a tight tolerance fit with the lower seal retainer over top of the eccentricity tolerant valve stem seal, in order to limit axial displacement of the upper portion of the seal due to high manifold pressure.

18 Claims, 2 Drawing Sheets

(56) References Cited

U.S. PATENT DOCUMENTS

| | | |
|---|---|---|
| 6,119,645 A | 9/2000 | Hesher |
| 6,209,504 B1 * | 4/2001 | Hegemier et al. .......... 123/188.6 |
| 6,394,463 B1 | 5/2002 | Otani |
| 6,450,143 B1 * | 9/2002 | Hegemier et al. .......... 123/188.6 |
| 6,571,761 B1 * | 6/2003 | Leimer ...................... 123/188.6 |
| 6,655,693 B2 | 12/2003 | Hosanna |
| 6,659,469 B1 | 12/2003 | Leimer |
| 6,722,657 B2 | 4/2004 | Hood |
| 6,764,079 B1 | 7/2004 | Hegemier |
| 7,299,779 B2 | 11/2007 | Hegemier |
| 7,438,036 B2 | 10/2008 | Hesher |
| 7,654,537 B2 | 2/2010 | Scarano |
| 7,862,048 B2 | 1/2011 | Scarano |
| 8,011,669 B2 | 9/2011 | Sakata |
| 8,235,394 B2 | 8/2012 | Sakata |
| 8,668,203 B2 | 3/2014 | Sakata |
| 8,764,019 B2 | 7/2014 | Zoppi |
| 2005/0001196 A1 * | 1/2005 | Mc Arthy et al. ............. 251/214 |
| 2008/0258406 A1 | 10/2008 | Dahlheimer |
| 2009/0256315 A1 | 10/2009 | Hamamoto |
| 2013/0015625 A1 | 1/2013 | Hegemier |
| 2013/0082203 A1 | 4/2013 | Kurth |
| 2013/0192555 A1 | 8/2013 | Nguyen |
| 2014/0130766 A1 | 5/2014 | Sakata |

FOREIGN PATENT DOCUMENTS

| | | |
|---|---|---|
| JP | 10 205623 A | 8/1998 |
| WO | WO2010/118834 A1 | 10/2010 |

* cited by examiner

ECCENTRICITY TOLERANT VALVE STEM SEAL ASSEMBLY

FIELD OF THE INVENTION

The present invention relates to an internal combustion engine valve stem seal assembly. More particularly, the present invention relates to a valve stem seal that is tolerant of eccentric motion of a valve stem.

BACKGROUND OF THE INVENTION

Those skilled in the art appreciate the manner in which intake and exhaust valves are employed in cylinder heads of internal combustion engines. In conventional overhead valve internal combustion engines, a pair of valves reciprocates in timed alternation to provide intermittent communication between the intake and exhaust manifolds and a combustion chamber.

The intake port of a combustion chamber is opened and closed by the reciprocating motion of at least one intake valve, which permits fuel mixed with air to flow into the combustion chamber. In addition, at least one exhaust valve and associated exhaust port are utilized for releasing expended combustion gases from the chamber.

In order to reduce wear associated with moving valve parts, lubrication is provided to the upper portions of the valves. However, because temperatures in the combustion chamber may approach or exceed 1000 degrees Centigrade, any lubricating oil exposed to these temperatures will vaporize or burn leaving behind deposits that may interfere with the proper sealing of the valves and cause rapid deterioration. Valve stem seal assemblies are used to seal against leakage of oil between each valve guide and its associated valve stem.

It is, therefore, necessary to at least provide seals around the upper region of the valve stems and along the valve guide. A typical valve stem seal has a generally cylindrical shape that is partially closed at one end. The cylindrical region seats about the valve guide to maintain the valve seal in a stationary position. The upper region of the valve stem is surrounded by the valve seal when the valve stem is fully inserted into the valve seal assembly.

However, all valve seals have limits as to how much guide-to-stem eccentricity (radial misalignment) they can handle and still adequately seal the valve stem. This can present itself statically from machining issues where the guide ID and OD are not machined concentrically to each other. This can also present itself dynamically when, during engine operation, the valve stem deflects (from stem-to-guide clearance or bending) which will increase loading on one side of the sealing lip and decrease loading on the opposite side of the sealing lip, possibly to the point of losing contact.

A traditional Dana Allbond™ seal assembly 5 (see prior art FIG. 1, owned by the common assignee, Dana Automotive System Group, LLC, Maumee, Ohio) was developed to solve the problems that valve seals encounter in engines that operate with manifold pressures in excess of 350 kPa. While the full metal reinforcement afforded by the extended metal retainer 6 of the traditional Allbond™ seal assembly 5 assists with resisting manifold pressure it, however, creates a seal assembly 5 that is not very radially compliant.

It appears that these problems with such valve stem seal assemblies 5 are a result of the upper and lower portions 7, 8 becoming mechanically coupled together, such that both upper and lower portions 7, 8 bend with a rigid stem (see, stem 62 in FIG. 3). In order to become eccentricity tolerant, somehow the upper portion 7 and the lower portion 8 of the seal assembly 5 need to move more independently of each other, possibly by making the seal assembly 5 more radially flexible. At the same time, however, the upper sealing lip 9 cannot be pulled too far toward the stem beyond its free state or else the upper lip 9 will leak oil and port gasses.

A further design constraint that needs to be considered is that, under high manifold pressures, the upper portion 7 of the seal assembly 5 has a force F (see FIG. 3) applied to it that wants to push the upper portion 7 of the seal assembly 5 upward and away from the lower portion 8 of the seal assembly 5. This in turn stretches the rubber (synthetic or actual) section between the metal stampings and creates stress risers in the rubber which could lead to tears in the upper portion 7. A means, therefore, is also sought to limit the axial displacement of the upper portion 7 of the seal assembly 5 when analysis shows that this is necessary.

U.S. Pat. No. 6,722,657 is an example of related art, which discloses a radial seal 100 for sealing an annular gap (not identified) defined between a bore 24 of a housing 90 and an outer surface of a cylindrical shaft (see axle 80). The seal comprises inner and outer rings 30 with foam seal elements 64a, 64b therein. Thereby, the seal forms a labyrinth (see area taken up by foam elements) that is subsequently filled with a highly viscous fluid 85.

Further, U.S. Pat. No. 6,655,693 shows a non-contacting gas compressor seal assembly that is positioned between a housing of, for example, a gas compressor and its rotatable shaft. The seal assembly contains the gas from passing between the shaft and the housing to the surrounding environment.

In addition, U.S. Pat. No. 5,558,056 discloses a valve stem seal that utilizes a finger spring 26, which is molded in a resilient body 24 that is used to keep an annular lip 28 in the resilient body in radial contact with a valve stem 12.

In U.S. Pat. No. 5,183,351, a boot retainer mechanism 133 retains a boot 112 on a joint 110 by way of bands 124, 132. The bands are coaxial with the central axis 140. Two flanges 144, 146, which are radially placed, cooperate with the bands to seal a shaft 116.

Also, U.S. Pat. No. 5,174,256 discloses a valve stem seal 10 that utilizes a spring 24 that applies a compressive force on a lip to seal a resilient seal to a valve stem 18. Two shells 12, 14 are allowed to move with respect to each other in order to allow for adjusting the guide height of the valve seal.

Lastly, U.S. Pat. No. 4,909,202 teaches a valve stem seal 10 encased in a shell 12. The seal body 14 is one piece where the shell acts to give support to a lip (not identified) that provides the sealing of the body to a valve stem 40.

Even with these means of sealing a reciprocating valve stem, none of the seals provide a means of sealing that is tolerant of the eccentric motion of a valve stem and particularly for engines exposed to high manifold pressures. As a result, a seal that is eccentrically tolerant to valve stem motion is sought.

SUMMARY OF THE INVENTION

An eccentricity tolerant valve stem seal assembly comprises an upper elastomeric seal portion having a radially inwardly directed upper sealing lip for contacting a valve stem. An upper seal retainer is disposed radially outwardly from the upper sealing lip and within the upper elastomeric seal portion. The upper seal retainer extends down and within the upper elastomeric seal portion. There is also a flexible middle elastomeric seal portion and a lower elastomeric seal portion that has at least one radially inwardly directed lower sealing lip for contacting a valve guide. Further, there is a lower seal retainer disposed up to a lower edge of the flexible middle elastomeric seal portion, wherein the lower elastomeric seal portion is disposed on an interior surface of the lower seal retainer for contacting the valve guide.

In cooperation with the above described structure, a separate cover may be pressed over top of the eccentricity tolerant valve stem seal, in order to limit the axial displacement of the upper portion of the seal for engines exposed to high manifold pressures. An interior surface of the cover is in intimate contact with an exterior surface of the lower seal retainer.

BRIEF DESCRIPTION OF THE DRAWINGS

The above, as well as other advantages of the present invention will become readily apparent to those skilled in the art from the following detailed description when considered in the light of the accompanying drawing in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 2:
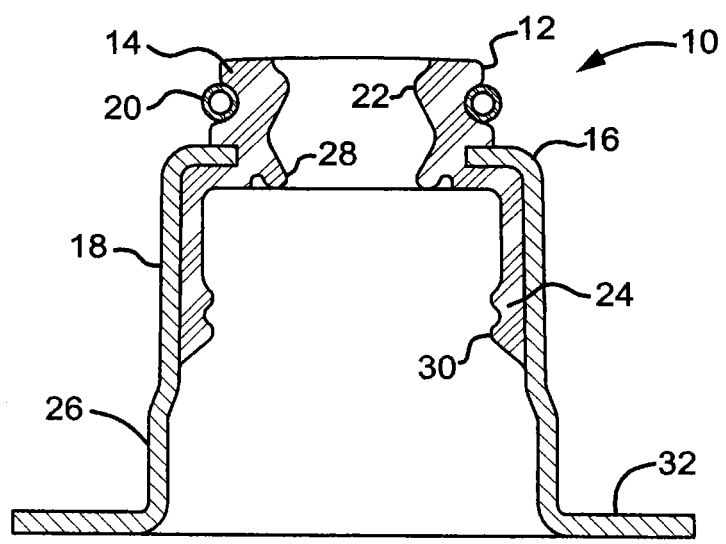
FIG. 2 is a cross-sectional side view of a second prior art valve stem seal assembly.

FIG. 2 illustrates a second prior art valve stem seal assembly 10 where an upper portion 12 of an elastomeric valve stem seal 14 is disposed above a rigid upper portion 16 of a valve seal retainer 18, wherein elastomeric is taken broadly herein to mean actual or synthetic rubber. A retainer ring 20 is disposed radially outward from an upper sealing lip 22, on the exterior of the upper portion 12 of the prior art valve stem seal 14. The upper portion 16 of the valve seal retainer 18 is radially disposed into a side of the elastomeric valve stem seal 14, axially below the upper sealing lip 22 and the retainer ring 20.

A lower portion 24 of the valve stem seal 14 is disposed down the inside of the valve seal retainer 18, above a lower portion 26 of the valve seal retainer 18. An optional middle sealing lip 28 is disposed axially below the upper sealing lip 22, in the elastomeric valve stem seal 14. At least one lower sealing lip 30 is disposed in the lower portion 24 of the valve stem seal 14. There is an outwardly radially extending flange 32, which is optional, that is connected perpendicular to the lower portion 26 of the prior art valve seal retainer 18 of FIG. 2.

Even with placing the upper portion 12 of the seal 14 above the rigid valve seal retainer 18, the upper portion 12 of the elastomeric valve stem seal 14 is rigidly connected to the lower portion 24 of the elastomeric valve stem seal 14 by way of the rigid valve seal retainer 18. By virtue of this rigidity, the valve stem seal 14 does not flex enough on an unloaded side of the upper sealing lip 22 to properly maintain its required sealing function, when a valve stem 62 (see FIG. 3) is experiencing excessive eccentric motion.

Figure 3:
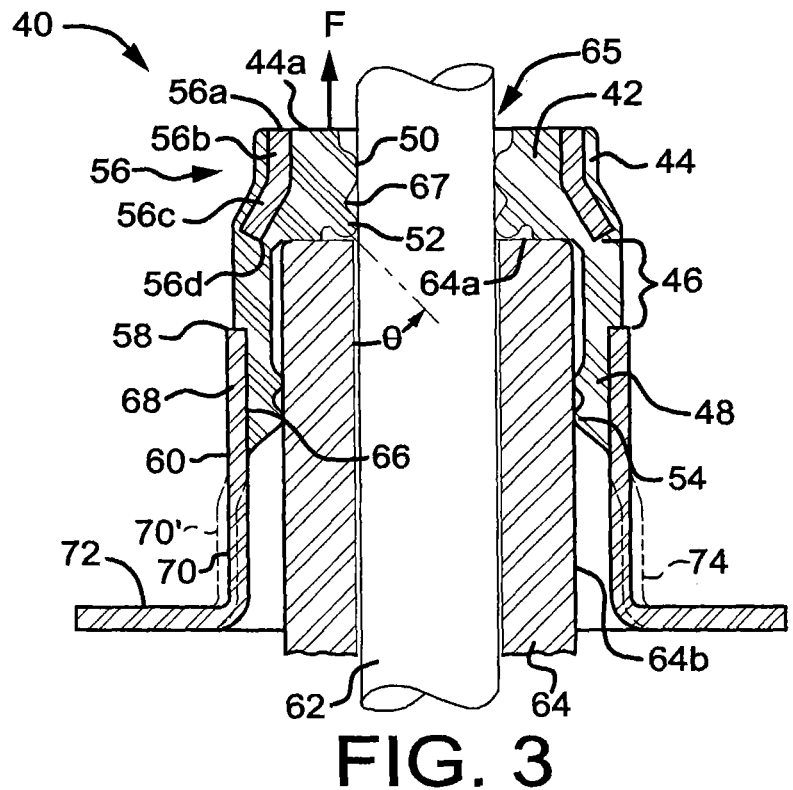
FIG. 3 is a cross-sectional side view of a valve stem seal assembly in accordance with the present invention.

FIG. 3, on the other hand, illustrates an eccentricity tolerant valve stem seal assembly 40 that comprises an annular elastomeric seal 42 having an upper elastomeric seal portion 44, a flexible middle elastomeric seal portion 46, and a lower elastomeric seal portion 48.

The upper elastomeric seal portion 44 has a first sealing lip 50 and an optional second sealing lip 52. The flexible middle elastomeric seal portion 46 has no sealing lip. The lower elastomeric seal portion 48 has at least a third sealing lip 54.

The upper elastomeric seal portion 44 also has a top surface 44a which is shown flush (but not required to be) with a top surface 56a of an upper portion 56b of an upper valve seal retainer 56 which may comprise a metal, plastic or other rigid non-metallic material that can withstand an environment of a cylinder head gasket of an internal combustion engine. The upper portion 56b of the upper seal retainer 56 is axially disposed down and into the upper elastomeric seal portion 44. The upper seal retainer 56 also has a lower portion 56c that is integrally connected to and unitary with the upper portion 56b of the upper seal retainer 56. It is possible that the upper valve seal retainer 56 may be entirely encased in the upper elastomeric seal portion 44.

A bottom tip 56d, which is an axially lowest point (i.e., lowest extent) of the upper seal retainer 56, defines a top of the flexible middle elastomeric seal portion and an axially oriented top edge 58 (i.e., highest extent) of a lower valve seal retainer 60 defines a bottom of the flexible middle elastomeric seal portion 46. The flexible middle elastomeric seal portion 46 may have a constant thickness throughout and has no metallic items dispose therein, as illustrated. There is no other structure within the flexible middle elastomeric seal portion 46. The lower valve seal retainer 60 may comprise a metal, plastic or other rigid non-metallic material that can withstand an environment of a cylinder head gasket of an internal combustion engine.

The first sealing lip 50 is radially inwardly directed for contacting the valve stem 62. The second sealing lip 52 is substantially directed inwardly at an angle θ from the axis of the valve stem 62 for making contact (i.e., interference fit) with the valve stem 62. The angle θ is greater than 0° and preferably 45°. The second sealing lip 52 is disposed axially below the first sealing lip 50, wherein both first and second sealing lips 50, 52 are disposed within a valve seal void 65. There is a connecting portion 67 within the elastomeric valve stem seal 14 that extends radially outward between the first and second sealing lips 50, 52.

The third sealing lip 54 is radially inwardly directed for contacting (i.e., interference fit) a side 64b of a valve guide 64 having a valve guide top 64a. The third sealing lip 54 is only disposed below the top edge 58 of the lower seal retainer 60.

The upper seal retainer 56 is disposed radially outwardly from the first sealing lip 50 and within the upper elastomeric seal portion 44. The upper seal retainer 56 extends down and within only the upper elastomeric seal portion 44 from the upper surface 44a of the upper elastomeric seal portion 44.

There is no portion of the upper seal retainer 56 or the lower seal retainer 60 that is disposed within the flexible middle elastomeric seal portion 46. The upper, middle, and lower elastomeric seal portions 56, 46, 60 are integrally connected and unitarily formed and may be formed of the same material, for example, rubber or synthetic rubber.

The lower elastomeric seal portion 48 is disposed on an interior surface 66 of an upper portion 68 of the lower seal retainer 60, just above a lower portion 70 embodiment or an alternate lower portion 70' embodiment (shown in dashed lines to distinguish it from the lower portion 70 embodiment) of the lower valve seal retainer 60.

The lower portion 70 of the lower valve seal retainer 60 extends axially downwardly from the upper portion 68 of the lower seal retainer 60. The alternate lower portion 70' of the lower valve seal retainer 60 extends radially outwardly from the upper portion 68 of the lower seal retainer 60 and then axially downwardly from the upper portion 68. When the seal assembly 40 structure comprises items 56, 46, 60, and 70', the seal assembly 40 is considered to be a guide-mounted seal.

Further, if an optional flange 72 is disposed perpendicular to either lower portions 70, 70' of the lower valve seal retainer 60, at the bottom of the eccentricity tolerant valve stem seal assembly 40, then the flange 72 is considered to be a spring seated extending flange 72, where the spring refers to the engine valve spring (not shown).

The upper seal retainer 56 and the lower seal retainer 60 are not connected to one another, which is critical for the middle portion 46 to be flexible, thereby allowing the valve stem seal assembly 40 to be eccentricity tolerant while maintaining an effective sealing function. This effective sealing function especially occurs between the upper sealing lip 50 and the valve stem 62. This is particularly the case for the unloaded side of the upper sealing lip 50 14 when the valve stem 62 is being exposed to high eccentric motion.

Figure 1:
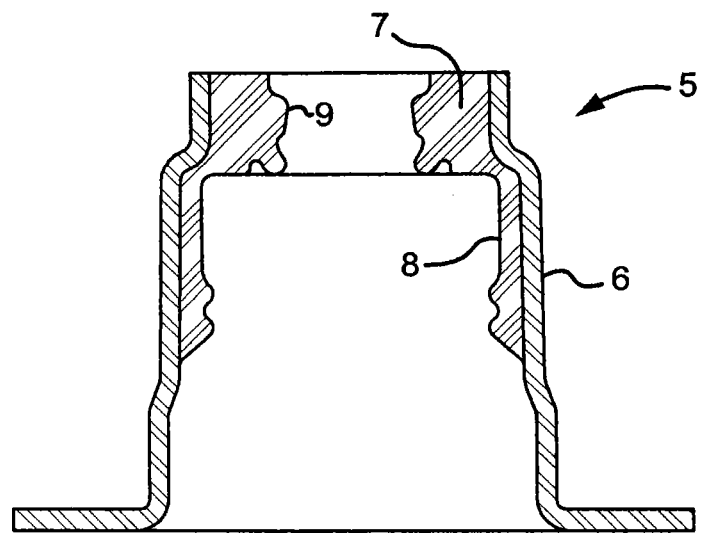
FIG. 1 is a cross-sectional side view of a prior art valve stem seal assembly.

As a result of the above described structure of the valve stem seal assembly 40, the flexible middle portion 46 of the eccentricity tolerant valve stem seal 42 has been found to mechanically decouple the lower seal retainer 60 from the upper seal retainer 56, which provides the radial support behind the upper sealing lip 50. This mechanical decoupling (as opposed to the mechanical coupling of the seals of prior art FIGS. 1 and 2) allows the upper elastomeric seal portion 44 to move radially in relationship with the lower elastomeric seal portion 48 which is connected to the inside surface 66 of the lower seal retainer 60 and to maintain proper sealing contact with the valve stem 62 and the valve guide 64. As mentioned, these characteristics are advantageous for an engine with a high degree of guide-to-stem eccentricity.

In contrast, radial flexibility can generally be built into a valve stem seal by increasing the membrane length (i.e., distance between the top of the valve retainer and the upper sealing lip on a traditional valve stem seal), as illustrated by the seal assembly 10 of prior art FIG. 2. However, if such a valve stem seal 10 is installed on an engine with a high degree of guide-to-stem eccentricity, the higher loaded side of the sealing lip will easily flex radially under a load of an eccentric valve stem, but the portion of the sealing lip on the opposite side of the valve stem seal will not be pulled toward the valve stem beyond its free state.

This is not the case for the instant invention which includes the upper seal retainer 56 molded radially outward from the upper stem sealing lip 50, where any radial deflection on a loaded side of the upper stem sealing lip 50 will cause the unloaded side of upper stem sealing lip 50 to move in the same direction and, consequently, maintain contact (i.e., interference fit) with the valve stem 50.

Figure 4:
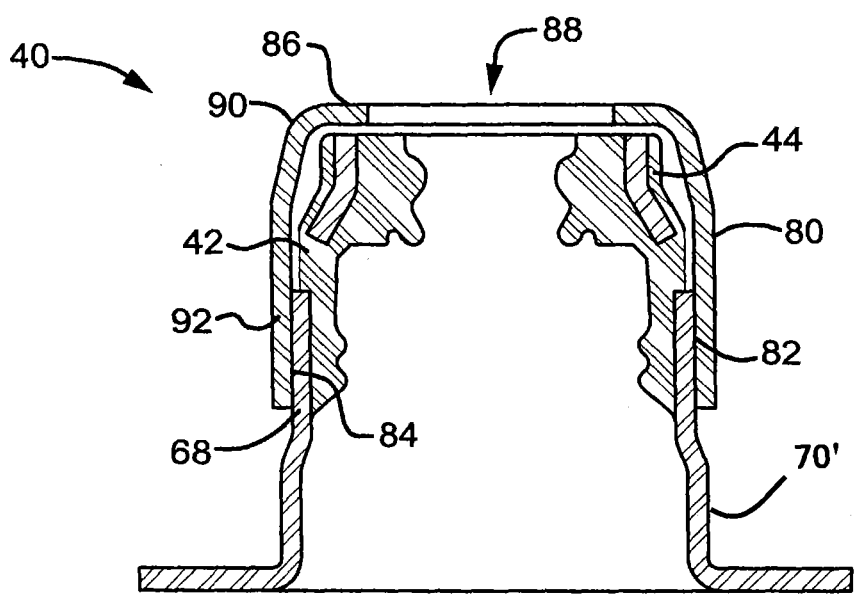
FIG. 4 is a cross-sectional side view of the valve stem seal assembly of FIG. 3 with a cover on top.

An additional feature that can be added to the eccentricity tolerant valve stem seal assembly 40, which is well suited for high manifold pressure above 350 kPa, is a separate cover 80 that is illustrated in FIG. 4. During assembly, the cover 80 can be pressed over top of the seal assembly 40 which would limit a potential axial displacement of the upper portion 44 of the seal 42. Analysis indicates that such a possible displacement from an upward directed force F (see FIG. 3) that is applied to the upper portion 44a of the seal 42 would be thwarted by the stamped cover 80. Otherwise, this force F may likely stretch the rubber (elastomeric) section between the seal retainer stampings 56, 60, which in turn could create stress risers in the elastomeric seal material that thereby could lead to tears.

The cover 80, which may comprise a separate metal stamping, has an interior side surface 82 that may be pressed over top of the eccentricity tolerant valve stem seal assembly 40, in order to limit the axial displacement of the upper portion of the seal 44. As a result, the interior surface 82 of the cover 80 is in intimate contact (known in the art as an interference fit, press fit or friction fit) with an exterior surface 84 of the upper portion 68 the lower seal retainer 60. When not exposed to high manifold pressures, the cover 80 atop the valve stem seal assembly 40 is not in contact with the annular elastomeric seal 42 as shown in FIG. 4. The cover 80 is complementary to the seal assembly 40 illustrated in FIG. 3. The lower portion 70' is normally not required when the cover 80 is not deployed. However, when the cover 80 is deployed, there likely is a need to have a larger radius for the lower portion 70' so as to accommodate a larger radius valve spring (not shown).

As seen in FIG. 4, the cover 80 comprises a generally flat upper layer 86 with an opening 88 through which the valve stem 62 (see, FIG. 3) is assembled, tapered upper sides 90, and vertical lower sides 92, all of which may be integrally formed and unitary. The opening 88 and the separation between the seal 42 and the cover 80 allow for significant eccentric motion of the valve stem 62. When the seal 42 experiences large manifold pressures in excess of 350 kPa, the cover 80 resists the force F (see, FIG. 3) from significantly displacing the top surface 44a of the seal 42 and thereby prevents damage to the seal 42.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. An eccentricity tolerant valve stem seal assembly, comprising:
    an upper elastomeric seal portion having a radially inwardly directed upper sealing lip in contact with a valve stem;
    an upper seal retainer disposed radially outwardly from the upper sealing lip and axially disposed down and into the upper elastomeric seal portion, wherein the upper seal retainer has a lower portion integrally connected to and unitary with an upper portion of the upper seal retainer;
    a flexible middle elastomeric seal portion disposed completely radially outward of the outermost periphery of a valve guide, wherein a bottom tip of the upper seal retainer axially extends down to a position having the same axial height as a top of the valve guide to define a top of the flexible middle elastomeric seal portion;
    a lower elastomeric seal portion; and
    a separate lower seal retainer disposed up to a lower edge of the flexible middle elastomeric seal portion with an exterior surface of the lower elastomeric seal portion disposed on an interior surface of the lower seal retainer, wherein an axially oriented top edge of the lower valve seal retainer defines a bottom of the flexible middle elastomeric seal portion;
    wherein the lower seal retainer is mechanically decoupled from the upper seal retainer by way of the flexible middle elastomeric seal portion.

2. The eccentricity tolerant valve stem seal assembly of claim 1, wherein a top surface of the upper seal retainer is flush with a top surface of the upper seal portion.

3. The eccentricity tolerant valve stem seal assembly of claim 1, wherein the flexible middle elastomeric seal portion is further defined to be between an axially lowest extent of the upper seal retainer and an axially highest extent of the lower seal retainer.

4. The eccentricity tolerant valve stem seal assembly of claim 3, wherein the flexible middle elastomeric seal portion comprises only elastomeric material.

5. The eccentricity tolerant valve stem seal assembly of claim 1, wherein the lower portion of the upper seal retainer is angled radially outwardly from the upper portion of the upper seal retainer.

6. The eccentricity tolerant valve stem seal assembly of claim 1, wherein the upper seal retainer is entirely encased in the upper elastomeric seal portion.

7. The eccentricity tolerant valve stem seal assembly of claim 1, wherein the upper and lower seal retainers comprise a metal, plastic or other rigid non-metallic material that can withstand an environment of a cylinder head gasket of an internal combustion engine.

8. The eccentricity tolerant valve stem seal assembly of claim 1, wherein the upper elastomeric seal portion has at least one radially inwardly directed second sealing lip.

9. The eccentricity tolerant valve stem seal assembly of claim 8, wherein the second sealing lip is substantially directed inwardly at an angle A from the axis of the valve stem for making intimate contact with the valve stem.

10. The eccentricity tolerant valve stem seal assembly of claim 9, wherein the angle $\theta$ is between 0° and 45°.

11. The eccentricity tolerant valve stem seal assembly of claim 8, further comprising a connecting portion within the upper elastomeric seal portion that extends radially outward between the first and second sealing lips.

12. The eccentricity tolerant valve stem seal assembly of claim 1, wherein a lower portion of the lower seal retainer extends axially downwardly from an upper portion of the lower seal retainer and is unitary with and connected perpendicular to an outwardly radially extending flange.

13. The eccentricity tolerant valve stem seal assembly of claim 12, wherein the lower portion of the lower seal retainer extends radially outwardly from the upper portion of the lower seal retainer.

14. The eccentricity tolerant valve stem seal assembly of claim 1, further comprising a cover disposed over top of the upper elastomeric seal portion, wherein an interior side surface of the cover is in intimate contact with an exterior of the lower seal retainer.

15. The eccentricity tolerant valve stem seal assembly of claim 14, wherein the lower portion of the lower seal retainer extends radially outwardly from the upper portion of the lower seal retainer and is unitary therewith.

16. The eccentricity tolerant valve stem seal assembly of claim 15, wherein the cover comprises a separate metal stamping.

17. An eccentricity tolerant valve stem seal assembly, comprising:
   an upper elastomeric seal portion having a radially inwardly directed upper sealing lip in contact with a valve stem;
   an upper seal retainer disposed radially outwardly from the upper sealing lip and axially disposed down and into the upper elastomeric seal portion, wherein the upper seal retainer comprises an axially aligned upper portion that is unitary with a lower portion that is radially angled outwardly;
   a flexible middle elastomeric seal portion disposed completely radially outward of the outermost periphery of a valve guide, wherein a bottom tip of the upper seal retainer axially extends down to a position having the same axial height as a top of the valve guide to define a top of the flexible middle elastomeric seal portion;
   a lower elastomeric seal portion; and
   a separate lower seal retainer disposed up to a lower edge of the flexible middle elastomeric seal portion with an exterior surface of the lower elastomeric seal portion disposed on an interior surface of the lower seal retainer;
   wherein the flexible middle elastomeric seal portion is defined to be between a lowest extent of the lower portion of the upper seal retainer and a highest extent of the upper portion of the lower seal retainer, wherein the lower seal retainer is mechanically decoupled from the upper seal retainer by way of the flexible middle elastomeric seal portion.

18. The eccentricity tolerant valve stem seal assembly of claim 17, wherein the seal portions comprise rubber or synthetic rubber.

* * * * *

UNITED STATES PATENT AND TRADEMARK OFFICE
CERTIFICATE OF CORRECTION

Page 1 of 1

PATENT NO. : 9,052,018 B2
APPLICATION NO. : 13/179648
DATED : June 9, 2015
INVENTOR(S) : Timothy A. Hegemier et al.

It is certified that error appears in the above-identified patent and that said Letters Patent is hereby corrected as shown below:

In the Claims

Column 7, line 24-27, Claim 9 is corrected where the angle from the axis is changed from "A" to "θ".

9. The eccentricity tolerant valve stem seal assembly of claim 8, wherein the second sealing lip is substantially directed inwardly at an angle θ from the axis of the valve stem for making intimate contact with the valve stem.

Signed and Sealed this
Sixth Day of October, 2015

Michelle K. Lee
*Director of the United States Patent and Trademark Office*